United States Patent [19]

McCready et al.

[11] Patent Number: 4,798,858

[45] Date of Patent: Jan. 17, 1989

[54] FLAME RETARDANT POLYETHERIMIDE ESTER ELASTOMERS

[75] Inventors: Russell J. McCready; Nan-I Liu; John A. Tyrell, all of Mt. Vernon, Ind.

[73] Assignee: General Electric Company, Pittsfield, Mass.

[21] Appl. No.: 21,822

[22] Filed: Mar. 4, 1987

[51] Int. Cl.$^4$ .............................................. C08K 5/34
[52] U.S. Cl. ................................................ 524/100
[58] Field of Search ......................................... 524/100

[56] References Cited

U.S. PATENT DOCUMENTS

| | | | |
|---|---|---|---|
| 2,465,319 | 3/1949 | Whinfield et al. | 526/71 |
| 2,910,466 | 10/1959 | Watt | 536/33 |
| 3,155,728 | 11/1964 | Lesesne | 564/505 |
| 3,236,895 | 2/1966 | Lee et al. | 564/505 |
| 3,651,014 | 3/1972 | Witsiepe | 528/301 |
| 3,654,370 | 4/1972 | Yeakey | 564/480 |
| 3,763,109 | 2/1973 | Witsiepe | 528/301 |
| 3,801,547 | 4/1974 | Hoeschele | 528/301 |
| 4,371,692 | 2/1983 | Wolfe, Jr. | 528/289 |
| 4,371,693 | 2/1983 | Wolfe, Jr. | 528/292 |
| 4,544,734 | 10/1985 | McCready | 524/100 |
| 4,552,950 | 12/1985 | McCready | 528/292 |
| 4,556,688 | 12/1985 | McCready | 524/100 |
| 4,556,705 | 12/1985 | McCready | 524/100 |

FOREIGN PATENT DOCUMENTS

| | | | |
|---|---|---|---|
| 18660 | 2/1978 | Japan | 524/100 |
| 189252 | 11/1983 | Japan | 524/100 |

Primary Examiner—Kriellion Morgan
Attorney, Agent, or Firm—William F. Mufatti

[57] ABSTRACT

A flame retardant composition comprising:
(i) at least one polyetherimide ester polymer; and
(ii) a flame retardant effective amount of at least one melamine compound.

50 Claims, No Drawings

FLAME RETARDANT POLYETHERIMIDE ESTER ELASTOMERS

BACKGROUND OF THE INVENTION

Polyetherimide ester elastomers comprised of the reaction products of (a) a low molecular weight diol, (b) a dicarboxylic acid, (c) a high molecular weight poly(oxy alkylene)diamine, and (d) a tricarboxylic acid or its derivative are known and are described in U.S. Pat. Nos. 4,544,734 and 4,556,705 to McCready and in U.S. Pat. No. 4,556,688 to McCready et al. These polyetherimide esters exhibit excellent stress-strain properties, low tensile set, high melting temperatures and/or excellent strength/toughness characteristics as well as superior flexibility, which properties render said polyetherimide esters especially suitable for molding and extrusion applications.

However, these polyetherimide esters, like most polymers, are somewhat flammable. It would thus be very advantageous if polyetherimide esters could be provided which exhibited reduced flammability, i.e., exhibited flame retardant properties. It has now been discovered that these polyetherimide ester polymers can be rendered flame retardant by admixing therewith a melamine compound.

SUMMARY OF THE INVENTION

Polyetherimide ester compositions are provided which exhibit flame retardant characteristics. These flame retardant compositions are comprised of at least one polyetherimide ester resin and at least one flame retardant compound, preferably at least one halogen and sulfur free flame retardant compound. More particularly, these flame retardant compositions are comprised of at least one polyetherimide ester resin and a flame retardant effective amount of at least one melamine compound, preferably a halogen-free melamine compound.

DESCRIPTION OF THE INVENTION

In accordance with the instant invention there are provided flame retardant polyetherimide ester compositions. These flame retardant thermoplastic polyetherimide ester compositions are comprised of (i) at least one thermoplastic polyetherimide ester polymer, and (ii) an effective flame retardant amount of at least one melamine compound.

The polyetherimide ester polymers of the present invention are well known elastomers and are described in U.S. Pat. Nos. 4,544,734 and 4,566,705 to McCready and in U.S. Pat. No. 4,566,688 to McCready et al., all of which are incorporated herein by reference.

These polyetherimide esters are comprised of the reaction products of:
(i) at least one diol;
(ii) at least one dicarboxylic acid or its ester forming reactive derivative; and
(iii) a set of reactants selected fro
   (a) (1) at least one high molecular weight poly(oxy alkylene)diamine, and (2) at least one tricarboxylic acid or its derivative, or
   (b) at least one high molecular weight polyoxyalkylene diimide diacid.

Suitable diols (i) for use in the preparation of the polyetherimide ester polymers of the present invention include the saturated and unsaturated aliphatic and cycloaliphatic dihydroxy compounds as well as the aromatic dihydroxy compounds. These diols are preferably of a low molecular weight, i.e., having a molecular weight of about 250 or less. When used herein, the term 'diol' and 'low molecular weight diol' should be construed to include equivalent ester forming derivatives thereof provided, however, that the aforementioned molecular weight requirement pertains to the diols only and not to their ester forming derivatives. Exemplary of ester forming derivatives of diols there may be given the acetates of the diols as well as, for example, ethylene oxide or ethylene carbonate for ethylene glycol.

The preferred saturated and unsaturated aliphatic and cycloaliphatic diols are those having from 2 to about 15 carbon atoms. Exemplary of these there may be given ethylene glycol, propanediol, butanediol, pentanediol, 2-methyl propanediol, 2,2-dimethyl propanediol, hexanediol, decanediol, 1,2-, 1,3- and 1,4- cyclohexane dimethanol, butenediol, hexenediol, etc. Especially preferred are 1,4-butanediol and mixtures thereof with hexanediol, 1,4-cyclohexane dimethanol, or butenediol, most preferably 1,4-butanediol.

Aromatic diols suitable for use in the practice of the present invention are generally those having from 6 to about 15 carbon atoms Included among the aromatic dihydroxy compounds are resorcinol, hydroquinone, 1,5-dihydroxy naphthalene, 4,4'-dihydroxy naphthalene, 4,4'-dihydroxy diphenyl, bis(p-hydrox phenyl)methane and bis(p-hydroxy phenyl)-2,2-propane Especially preferred diols are the saturated aliphatic diols, mixtures thereof, and mixtures of a saturated diol(s) with an unsaturated diol(s), wherein each diol contains from 2 to about 8 carbon atoms. Where more than one diol is employed, it is generally preferred that at least about 60 mole %, based on the total diol content, be the same diol, more preferably at least 80 mole %. As mentioned above, the preferred compositions are those in which 1,4-butanediol is present in a predominant amount, most preferably when 1,4-butanediol is the only diol.

Dicarboxylic acids (ii) which are suitable for use in the practice of the present invention are aliphatic, cycloaliphatic, and/or aromatic dicarboxylic acids. These acids are preferably of a low molecular weight, i.e., having a molecular weight of less than about 300. However, in some cases higher molecular weight dicarboxylic acids may be used. The term 'dicarboxylic acids' as used herein, includes equivalents of dicarboxylic acids having two functional carboxyl groups which perform substantially like dicarboxylic acids in reaction with glycols and diols in forming polyesters. These equivalents include esters and esterforming reactive derivatives, such as acid halides and anhydrides. The molecular weight preference mentioned above pertains to the acid and not to its equivalent ester or ester-forming derivatives. Thus, an ester of a dicarboxylic acid having a molecular weight greater than about 300 or an acid equivalent of a dicarboxylic acid having a molecular weight greater than about 300 are included provided the acid has a molecular weight below about 300. Additionally, the dicarboxylic acids may contain any substituent groups(s) or combinations which do not substantially interfere with the polymer formation and use of the polymer of this invention.

Aliphatic dicarboxylic acids, as the term is used herein, refer to carboxylic acids having two carboxyl groups each of which is attached to a saturated carbon atom. If the carbon atom to which the carboxyl group is attached is saturated and is in a ring, the acid is cycloaliphatic.

Aromatic dicarboxylic acids, as the term is used herein, are dicarboxylic acids having two carboxyl groups each of which is attached to a carbon atom in an isolated or fused benzene ring system. It is not necessary that both functional carboxyl groups be attached to the same aromatic ring and where more than one ring is present, they can be joined by aliphatic or aromatic divalent radicals such as —O— or —SO$_2$—.

Representative aliphatic and cycloaliphatic acids which can be used for this invention are sebacic acid, 1,2-cyclohexane dicarboxylic acid, 1,3-cyclohexane dicarboxylic acid, adipic acid, glutaric acid, succinic acid, oxalic acid, dimer acid, 4-cyclohexene-1, 2-dicarboxylic acid, 2-ethysuberic acid, tetramethylsuccinic acid, cyclopentanedicarboxylic acid, decahydro-1,5 naphthlene dicarboxylic acid, 4,4'-bicyclohexyl dicarboxylic acid, decahydro-2,6 naphthalene dicarboxylic acid, 4,4 methylenebis(cyclohexane carboxylic acid), 3,4-furan dicarboxylic acid, and 1,1-cyclobutane dicarboxylic acid. Preferred aliphatic acids are cyclohexane dicarboxylic acids, sebacic acid, glutaric acid and adipic acid.

Representative aromatic dicarboxylic acids which can be used include terephthalic, phthalic and isophthalic acids, bi-benzoic acid, substituted dicarboxy compounds with two benzene nuclei such as bis(p-carboxyphenyl)methane, oxybis(benzoic acid), ethylene-1,2-bis(p-oxybenzoic acid, 1,5-naphthalene dicarboxylic acid, 2,6-naphthalene dicarboxylic acid, 2,7-naphthalene dicarboxylic acid, phenantherene dicarboxylic acid, anthracene dicarboxylic acid, 4,4'-sulfonyl dibenzoic acid, and halo and C$_1$-C$_{12}$ alkyl, alkoxy, and aryl ring substitution derivatives thereof. Hydroxy acids such as p(beta-hydroxyethoxy)benzoic acid can also be used provided an aromatic dicarboxylic acid is also present.

Preferred dicarboxylic acids for the preparation of the polyetherimide esters of the present invention are the aromatic dicarboxylic acids, mixtures thereof and mixtures of one or more dicarboxylic acids with an aliphatic and/or cycloaliphatic dicarboxylic acid, most preferably the aromatic dicarboxylic acids. Among the aromatic acids those with 8–16 carbon atoms are preferred, particularly the benzene dicarboxylic acids, i.e., phthalic, terephthalic and isophthalic acids and their dimethyl derivatives. Especially preferred is dimethyl terephthalate.

Finally, where mixtures of dicarboxylic acids are employed in the practice of the present invention, it is preferred that at least about 60 mole %, preferably at least about 80 mole %, based on 100 mole % of dicarboxylic acid (ii) be the same dicarboxylic acid or ester derivative thereof. As mentioned above, the preferred compositions are those in which dimethylterephthalate is the predominant dicarboxylic acid, most preferably when dimethylterephthalate is the only dicarboxylic acid.

The polyetherimide ester polymers of the present invention may be prepared by a one-pot synthesis involving the reaction of the diol (i), the dicarboxylic acid (ii), the high molecular weight poly(oxy alkylene)diamine (iii)(a)(1), and the tricarboxylic acid or its derivative (iii)(a)(2). In such a synthesis the polyoxyalkylene diimide diacid (iii)(b) is formed in-situ by the reaction of the poly(oxy alkylene)diamine with the tricarboxylic acid.

The poly(oxy alkylene)diamines (iii)(a)(1) suitable for use in the present invention may be represented by the following general formula

$$H_2N-G-NH_2 \qquad (I)$$

wherein G is the radical remaining after the removal of the amino groups of a long chain alkylene ether diamine. These polyether diprimary diamines are available commercially from a Texaco Chemical Company under the trademark JEFFAMINE. In general they are prepared by known processes for the amination of glycols. For example, they may be prepared by aminating the glycol in the presence of ammonia, Raney nickel catalyst and hydrogen as set forth in Belgium Pat. No. 634,741. Alternately, they may be prepared by treating glycol with ammonia and hydrogen over a Nickel-Copper-Chromium catalyst as taught by U.S. Pat. No. 3,654,370. Other methods for the production thereof include those taught by U.S. Pat. Nos. 3,155,728 and 3,236,895 and French Pat. Nos. 1,551,605 and 1,466,708, all of the foregoing patents are incorporated herein by reference.

The long chain ether diamines suitable for use herein are the polymeric diamines having terminal (or as nearly terminal as possible) amine groups and an average molecular weight of from about 600 to about 12,000, preferably from about 900 to about 4,000. Additionally, the long chain ether diamines will generally have a carbon-to-oxygen ratio of from about 1.8 to about 4.3.

Representative long chain ether diamines are the poly(alkylene ether)diamines including poly(ethylene ether)diamine, poly(propylene ether)diamine, poly(tetramethylene ether)diamine; random or block copolymers of ethylene oxide and propylene oxide including propylene oxide and poly(propylene oxide) terminated poly(ethylene ether)diamine; and aminated random or block copolymers of tetrahydrofuran with minor amounts of a second monomer such as ethylene oxide, propylene oxide, and methyl tetrahydrofuran (used in proportions such that the carbon-to-oxygen mole ratio in the diamine does not exceed about 4.3 to 1). Polyformyl diamines prepared by reacting formaldehyde with diols such as 1,4-butanediol and 1,5-pentanediol and subsequently aminating are useful. Especially preferred poly(alkylene ether) diamines are poly(propylene ether)diamine, poly (tetramethylene ether)diamine, and the poly(ethylene ether)glycols which are end-capp,ed with poly (propylene ether) and/or propylene oxide and subsequently aminated.

In general, the polyoxyalkylene diamines useful in the practice of the present invention have an average molecular weight of from about 600 to about 12,000, preferably from about 900 to about 4,000.

The tricarboxylic acid (iii)(a)(2) may be almost any carboxylic acid anhydride containing an additional carboxylic group or the corresponding acid thereof containing two imide-forming vicinal carboxyl groups in lieu of the anhydride group. Mixtures thereof are also suitable. The additional carboxylic group must be esterifiable.

While trimellitic anhydride is preferred as the tricarboxylic acid component, any number of suitable tricarboxylic acid constituents will occur to those skilled in the art including 2,6,7-naphthalene tricarboxylic anhydride, 3,3',4-diphenyl tricarboxylic anhydride, 3,3',5-benzophenone tricarboxylic anhydride, 1,3,4-cyclopentane tricarboxylic anhydride, 2,2',3-diphenyl tricarboxylic anhydride, diphenyl sulfone-3,3',4-tricarboxylic anhydride, ethylene tricarboxylic anhydride, 1,2,5-naphthalene tricarboxylic anhydride, 1,2,4-butane tricarboxylic anhydride, and 1,3,4-cyclohexane tricarboxylic anhydride. These tricarboxylic acid materials can be characterized by the following general formula

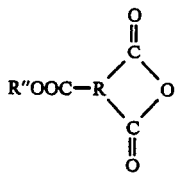
II.

wherein:

R is a trivalent organic radical, preferably a $C_1$–$C_{20}$ aliphatic or cycloaliphatic, or $C_6$–$C_{20}$ aromatic trivalent radical;

R" is preferably hydrogen or a monovalent organic radical preferably selected from $C_1$–$C_6$ aliphatic and/or cycloaliphatic radicals and $C_6$–$C_{12}$ aromatic radicals, e.g., benzyl; most preferably hydrogen.

In the preparation of the instant polyetherimide ester polymers sufficient amounts of diol versus dicarboxylic acid, and tricarboxylic acid versus diamine must be present, as recognized in the art, to allow for substantially complete polymerization.

This type of one-pot reaction involving the reactions of (i) a diol component, (ii) a dicarboxylic acid component, (iii)(a)(1) a poly(oxy alkylene)diamine component, and (iii)(a)(2) a tricarboxylic acid component is described in U.S. Pat. No. 4,556,688 to McCready et al. incorporated herein by reference. In this type of one-pot reaction the amount of diol (i) employed will be, in general, a molar excess, preferably about 1.5 molar equivalents, based on the combined molar equivalents of dicarboxylic acid (ii) and of the total moles of the tricarboxylic acid (iii)(a)(2). The amount of the tricarboxylic acid employed will preferably be about two molar equivalents based on the number of moles of the poly(oxy alkylene) diamine. Obviously, less than two molar equivalents would result in incomplete imidization of the diamine resulting in potentially poorer properties. Conversely, greater than two molar equivalents of the tricarboxylic acid may lead to cross-linking and/or branching of the polymer. Generally, mole ratios of 2 moles tricarboxylic acid to 0.85 to 1.15 moles of poly(oxy alkylene)diamine yield useful polymers.

The amount by which the diamine (iii)(a)(1) and the dicarboxylic acid (ii) are used is generally not critical in forming the polyetherimide esters of the present invention. However, preferred amounts of the poly(oxy alkylene)diamine and dicarboxylic acid used are such that the weight ratio of the theoretical amount of the polyoxyalkylene diimide diacid, formable from the poly(oxy alkylene)diamine and the tricarboxylic acid, to the dicarboxylic acid is from about 0.002 to 2.0:1, preferably from about 0.01 to 2.0:1, and more preferably from about 0.25 to 2.0, and most preferably from about 0.4 to 1.4. The actual weight ratio will be dependent upon the specific poly(oxy alkylene)diamine and tricarboxylic acid used and more importantly upon the d.esired physical and chemical properties of the resultant polyetherimide ester. In general, the lower the ratio of the theoretical amount of polyoxyalkylene diimide diacid to dicarboxylic acid the better the strength. crystallization and heat distortion properties of the polymer. Alternatively, the higher the ratio, the better the the flexibility, tensile set and low temperature impact characteristics.

The instant polyetherimide esters may also be prepared by a two-pot synthesis involving the reprepared action of the diol (i), the dicarboxylic acid (ii), and the polyoxyalkylene diimide diacid (iii) (b). Such a reaction is described in U.S. Pat. No. 4,556,705 to McCready, incorporated herein by reference. Basically, in this process the poly(oxy alkylene)diamine is reacted with the tricarboxylic acid to form a polyoxyalkylene diimide diacid, and the preformed polyoxyalkylene diimide diacid is then reacted with the diol and the dicarboxylic acid to form the polyetherimide ester polymers.

The polyoxyalkylene diimide diacid (iii)(b) may be represented by the general formula

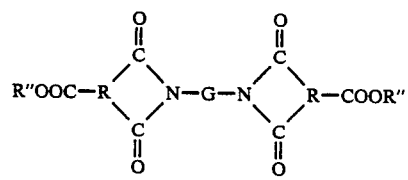
III.

wherein G, R and R" are as defined hereinafore.

The polyoxyalkylene diimide diacids of Formula III suitable for use herein are high molecular weight diimide diacids having an average molecular weight greater than about 700, preferably greater than about 900. They may be prepared by the imidization reaction of one or more tricarboxylic acids (iii)(a)(2) containing two vicinal carboxyl groups or an anhydride group and an additional carboxyl group which must be esterifiable with the high molecular weight poly (oxy alkylene)diamine (iii)(a)(1). These polyoxyalkylene diimide diacids and processes for their preparation are disclosed in U.S. Pat. No. 4,556,705, incorporated herein by reference. Briefly, these polyoxyalkylene diimide diacids may be prepared by known imidization processes including melt synthesis or by synthesizing in a solvent system. Such reactions generally occur at temperatures from about 100° C. to about 300° C., preferably at temperatures from about 150° C. to about 250° C., while drawing off water or in a solvent system at the reflux temperature of the solvent or azeotropic (solvent) mixture.

In this two-pot process, as in the one-pot process described hereinafore, it is generally preferred that the diol be present in at least a molar equivalent amount, preferably a molar excess, most preferably at least 150 mole % based on the moles of dicarboxylic acid and polyoxyalkylene diimide diacid combined. Such molar excess of diol generally allows for optimal yields, based on the amount of acids, while accounting for the loss of diol during esterification.

In this two-pot process the amount of polyoxyalkylene diimide diacid and dicarboxylic acid utilized is generally not critical in forming the polyetherimide esters of the present invention. However, preferred amounts of the polyoxyalkylene diimide diacid and dicarboxylic acid used are such that the weight ratio of the polyoxyalkylene diimide diacid to the dicarboxylic acid is from about 0.002 to 2.0:1, preferably from about 0.01 to 2.0:1, more preferably from about 0.25 to 2.0:1, and most preferably from about 0.4 to 1.4:1.

It is also possible, as described in U.S. Pat. No. 4,556,688, to prepolymerize the aromatic dicarboxylic acid and the diol to form a prepolyester, and then react this prepolyester with either the diimide diacid or with the tricarboxylic acid and the poly(oxy alkylene)diamine. Forming the prepolyester can be achieved by conventional esterification techniques such as those described in U.S. Pat. Nos. 2,465,319 and 2,910,466, all of which are incorporated herein by reference.

In its preferred embodiment, the polyetherimide esters of the instant invention comprise the reaction products of dimethylterephthalate, optionally with up to 40 mole percent of another dicarboxylic acid or its ester forming derivative; butane diol, optionally with another diol such as butene diol, ecular weight of from about 600 to about 12,000, preferably from about 900 to about 4,000, and trimellitic anhydride, or a polyoxyalkylene diimide diacid.

In the process of the present invention, particularly where all of the reactants are charged to the reactor together or where the polyoxyalkylene diimide diacid is preformed and excess tricarboxylic acid is present, a minor amount of the tricarboxylic acid or anhydride may react with available hydroxyl groups and ultimately function as a branching agent in the finished polymer. Within limits, the degree of branching in the finished polymer can be controlled by varying the mole ratio of tricarboxylic acid to poly(oxy alkylene)diamine. An excess of diamine reduces the degree of branching, while an excess of the tricarboxylic acid increases branching. In addition to controlling branching by varying the tricarboxylic acid/diamine mole ratio, one can compensate for branching by introducing a monofunctional reactant such as benzoic acid in minor amounts.

With reference to branching, it should be noted that polymers of this invention, when prepared from preformed diimide diacid, are substantially free of branching. If branching is desired, one needs only to introduce a branching agent, such as trimellitic anhydride, along with the preformed diimide diacid. The amount of branching agent will generally be less than about 0.15 moles per mole of diacid. Useful branching agents other than trimellitic anhydride include trimethyl trimellitate, glycerol, trimethylol propane, trimesic acid and its esters, and the like.

The instant polyetherimide esters may be prepared by conventional esterification/condensation reactions for the production of polyesters. These processes are described, inter alia, in U.S. Pat. Nos. 3,763,109; 3,651,014; 3,801,547; 4,556,705, and 4,556,688, all of which are incorporated herein by reference.

The polyetherimide esters of the instant invention contain at least the following two recurring structural units:

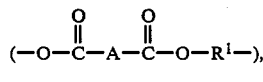

and

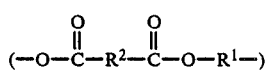

wherein:

A is the residue of the polyoxyalkylene diimide diacid absent the two carboxyl groups, i.e.,

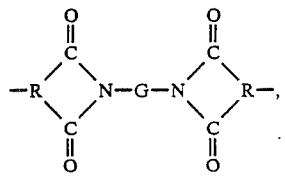

$R^1$ is the residue of the diol absent the two hydroxyl groups, $R^2$ is the residue of the dicarboxylic acid absent the two carboxyl groups, and G is as defined hereinafore..

Additionally, while not required, it is customary and preferred to utilize a catalyst or catalyst system in the process for the production of the present polyetherimide esters. These types of catalysts are set forth in U.S. Pat. Nos. 4,556,705 and 4,566,688, both of which are incorporated herein by reference.

Both batch and continuous methods can be used for any stage of the ether imide ester polymer preparation. Polycondensation of the polyester prepolymer with the polyoxyalkylene diimide diacid can also be accomplished in the solid phase by heating finely divided solid polyester prepolymer with the diimide diacid in a vacuum or in a stream of inert gas to remove the liberated low molecular weight diol. This method has the advantage of reducing degradation because it must be used at temperatures below the softening point of the prepolymer.

The melamine compounds which are used as the flame retardant agents or additives in the instant compositions are well known compounds which are generally commercially available or may be readily prepared by known and conventional methods. These melamine compounds may be represented by the general formula

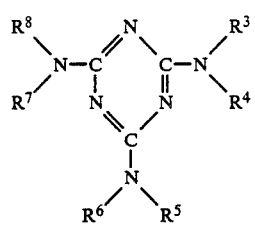

VI.

wherein $R^3$–$R^8$ are independently selected from hydrogen, monovalent hydrocarbon radicals, substituted monovalent radicals, —$CH_2OH$, and —$CH_2O(CH_2)_xH$ wherein x is an integer from 1 to about 4; with the proviso that when $R^3$–$R^8$ are selected from monovalent hydrocarbon radicals and substituted monovalent hydrocarbon radicals the total number or sum of the carbo atoms present in $R^3$–$R^8$ does not exceed about 20, preferably about 10, and more preferably about 6.

The monovalent hydrocarbon radicals represented by $R^3$–$R^8$ generally contain from 1 to about 14 carbon atoms, preferably from 1 to about 8 carbon atoms, and more preferably from 1 to about 5 carbon atoms. They include the alkyl, cycloalkyl, aryl, aralkyl and alkaryl radicals. The preferred alkyl radicals are those containing from 1 to about 8 carbon atoms, with the more preferred alkyl radicals being those containing from 1 to about 5 carbon atoms The alkyl radicals include both the straight chain and branched alkyl radicals. The preferred cycloalkyl radicals are those containing from 4 to about 8 ring carbon atoms. The preferred aryl radicals are those containing from 6 to 12 ring carbon atoms, i.e., phenyl, biphenyl, and naphthyl, with those containing 6 ring carbon atoms being the more preferred aryl radicals The preferred aralkyl and alkaryl radicals are those containing from 7 to about 14 carbon atoms, with those containing from 7 to about 8 carbon atoms being more preferred.

Particularly preferred monovalent hydrocarbon radicals represented by $R^3$–$R^8$ are the alkyl radicals, particularly those alkyl radicals containing from 1 to about 5 carbon atoms.

The substituted monovalent hydrocarbon radicals represented by $R^3$–$R^8$ are those monovalent hydrocarbon radicals as described above which contain from 1 to about 4 substituent groups thereon. The preferred substituents are the halogens, preferably chlorine and bromine. Particularly preferred substituted monovalent hydrocarbon radicals are the bromine and chlorine substituted alkyl radicals, preferably those alkyl radicals containing from 1 to about 5 carbons.

It is to be understood that when substituent groups are present on the monovalent hydrocarbon radicals represented by $R^3$–$R^8$ they may be the same or different.

The preferred compounds of Formula VI are those wherein $R^3$–$R^8$ are independently selected from hydrogen and monovalent hydrocarbon radicals. The preferred melamine compounds of this type are those wherein $R^3$–$R^8$ are independently selected from hydrogen and alkyl radicals, preferably alkyl radicals containing from 1 to about 5 carbon atoms.

The most preferred compound of Formula VI is melamine, i.e., wherein $R^3$–$R^8$ are all hydrogen.

Some illustrative non-limiting examples of melamine compounds of Formula VI, with various types of $R^3$ to $R^8$ groups, are set forth below:

| $R^3$ | $R^4$ | $R^5$ | $R^6$ | $R^7$ | $R^8$ |
|---|---|---|---|---|---|
| H | H | H | H | H | H |
| —$CH_3$ | H | —$CH_3$ | H | —$CH_3$ | H |
| —$CH_3$ | —$CH_3$ | —$CH_3$ | —$CH_3$ | —$CH_3$ | —$CH_3$ |
| —$CH_3$ | H | ethyl | H | propyl | propyl |
| —$CH_2Cl$ | H | —$CH_2Cl$ | H | —$CH_2Cl$ | H |
| —$CH_2Cl$ | —$CH_3$ | H | H | H | —$CH_2CH_2Br$ |
| phenyl | H | phenyl | H | H | H |
| propyl | propyl | propyl | propyl | propyl | propyl |
| H | H | phenyl | H | —$CHBr_2$ | —$CH_3$ |
| H | phenyl | H | phenyl | H | phenyl |
| H | —$CH_3$ | H | H | H | H |
| H | ethyl | H | H | H | H |

The amount of the melamine compound which is present in the instant compositions is an effective flame retardant amount. By effective flame retardant amount is meant an amount of at least one melamine compound which is effective to flame retard the polyetherimide ester polymers. Generally, this amount is at least about 10 weight percent, based on the total amounts of melamine and polyetherimide ester resin present in the compositions, preferably at least about 15 weight percent, and more preferably at least about 20 weight percent. Generally, an amount of about 60 weight percent of melamine should not be exceeded, preferably an amount of about 50 weight percent of melamine should not be exceeded. Generally, if the compositions contain less than about 10 weight percent of melamine compound there is no significant improvement in the flame retardancy of the polyetherimide ester polymer. Amounts of melamine in excess of about 60 weight percent do not appreciably increase or improve the flame retardancy of the polyetherimide ester polymers.

It is to be understood that the instant compositions may contain only one melamine compound, or they may contain a mixture of two or more different melamine compounds. Furthermore, the amount of melamine compound used is dependent upon the particular melamine compound utilized and upon the particular polyetherimide ester polymer.

The instant compositions may also optionally contain such commonly known and used additives as oxidative stabilizers; thermal stabilizers; ultraviolet radiation stabilizers; and fillers.

Many of the oxidative and/or thermal stabilizers known in the art for copolyesters may be used in the practice of the present invention. These may be incorporated into the compositions either during polymerization or while in a hot melt stage following polymerization. Satisfactory stabilizers of this type include the phenols and their derivatives, compounds containing both hydroxyl and amine groups, hydroxyazines, oximes, polymeric phenolic esters, and salts of multivalent metals in which the metal is in its lower valence state. Some specific examples of these stabilizers are described in U.S. Pat. No. 4,556,688, incorporated herein by reference.

The ultraviolet radiation stabilizers include, are not limited to, the benzophenone derivatives, benzotriazole derivatives, and cyanoacrylates. The fillers include, but are not limited to, carbon black, silica gel, alumina, clays, and chopped fiberglass or glass particles. These fillers may be incorporated in amounts of up to about 50 weight percent, preferably up to about 30 weight percent.

DESCRIPTION OF THE PREFERRED EMBODIMENT

The following examples are presented to more fully and clearly illustrate the present invention. They are presented as illustrative of the invention and are not to be construed as limiting the invention thereto. In the examples all parts and percentages are on a weight basis unless otherwise specified.

The following example illustrates a polyetherimide ester polymer composition falling outside the scope of the instant invention in that it does not contain any melamine compound flame retardant. This example is presented for comparative purposes only.

EXAMPLE 1

A polyetherimide ester resin, comprised of the reaction products of a preformed polyoxyalkylene diimide diacid (formed by the reaction of JEFFAMINE D-2000 and trimellitic anhydride), dimethylterephthalate, and butanediol, with a weight ratio of polyoxyalkylene diimide diacid to dimethylterephthalate being 0.7:1, is formed, by injection molding, into test bars measuring $5'' \times \frac{1}{2}'' \times 1/16''$. These test bars are subjected to the test procedure set forth in Underwriters Laboratories Inc. Bulletin UL-94 Burning Test for Classified Materials, and the results are set forth in Table I.

In accordance with this test procedure, materials that pass are rated V-O, V-I, or V-II based on the results of 5 specimens. The criteria for each V (for vertical) rating per UL-94 is briefly as follows:

"V-O": Average flaming and/or glowing after removal of the igniting flame shall not exceed 5 seconds and none of the specimens shall drip flaming particles which ignite absorbent cotton.

"V-I": Average flaming and/or glowing after removal of igniting flame shall not exceed 25 seconds and the glowing does not travel vertically for more than ⅛" of the specimen after flaming ceases and glowing is incapable of igniting absorbent cotton.

"V-II": Average flaming and/or glowing after removal of igniting flame shall not exceed 25 seconds and the specimens drip flaming particles which ignite absorbent cotton.

In addition, a test bar which continues to burn for more than 25 seconds after removal of the igniting flame is classified, not by the standards of UL-94 but by the standards of this invention, as "burns". Further, UL-94 requires that all test bars in each group must meet the V-type rating to achieve the particular classification. Otherwise, the 5 test bars receive the rating of the worst single bar. For example, if one bar is classified as V-II and the other 4 are classified as V-O, then the rating for all 5 bars is V-II.

The following examples illustrate compositions of the present invention.

EXAMPLE 2

A resin composition containing 70 parts by weight of a polyetherimide ester resin of the type used in Example 1 and 30 parts by weight of melamine is injection molded into test bars of the same dimensions as in Example 1. These test bars are subjected to test procedure UL-94. The results are set forth in Table I.

EXAMPLE 3

A resin composition containing 60 parts by weight of a polyetherimide ester resin of the type used in Example 1 and 40 parts by weight of melamine is injection molded into test bars of the same dimensions as in Example 1. These test bars are subjected to test procedure UL-94. The results are set forth in Table I.

Additionally, the following properties of the compositions of Examples 1-3 are determined and the results are set forth in Table I:

Flexural Modulus (FM) in accordance with test procedure ASTM D790;

Tensile Strength (TS) in accordance with test procedure ASTM D638; and

Tensile Elongation (TE) in accordance with test procedure ASTM D638.

TABLE I

| Example No. | UL-94 | FM psi × 10³ | TE in % | TS psi × 10³ |
|---|---|---|---|---|
| 1 | burns | 22 | 243 | 2.8 |
| 2 | V-II | 54.8 | 52 | 2.5 |
| 3 | V-O | 81.6 | 14 | 2.6 |

As illustrated by the data in Table I the compositions of the present invention, Examples 2 and 3, exhibit flame retardant properties as compared with the neat polyetherimide ester resin of Example 1.

The compositions of the instant invention are useful in the production of molded articles, films, and the like.

Obviously, other modifications and variations of the present invention are possible in light of the above teachings. It is therefore to be understood that changes may be made in the particular embodiments of the invention described which are within the full intended scope of the invention as defined by the claims.

What is claimed is:

1. A flame retardant composition comprising:
   (i) at least one polyetherimide ester resin; and
   (ii) a flame retardant effective amount of at least one melamine compound.

2. The composition of claim 1 which contains at least about 10 weight percent of at least one melamine compound.

3. The composition of claim 2 which contains at least about 15 weight percent of at least one melamine compound.

4. The composition of claim 3 which contains at least about 20 weight percent of at least one melamine compound.

5. The composition of claim 1 wherein said melamine compound is represented by the formula

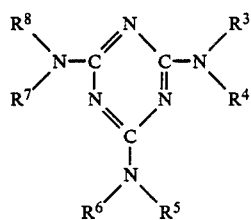

wherein $R^3$-$R^8$ are independently selected from hydrogen, monovalent hydrocarbon radicals, substituted monovalent hydrocarbon radicals, $-CH_2OH$, or $-CH_2O(CH_2)_xH$ wherein x is an integer of from 1 to about 4, with the proviso that when $R^3$-$R^8$ are selected from monovalent hydrocarbon radicals or substituted monovalent hydrocarbon radicals the total number of carbon atoms present in $R^3$-$R^8$ does not exceed about 20.

6. The composition of claim 1 wherein the total number of carbon atoms present in $R^3$-$R^8$ does not exceed about 10.

7. The composition of claim 6 wherein the total number of carbon atoms present in $R^3$-$R^8$ does not exceed about 6.

8. The composition of claim 5 wherein said substituted monovalent hydrocarbon radicals represented by $R^3$-$R^8$ are independently selected from halogen substituted monovalent hydrocarbon radicals.

9. The composition of claim 8 wherein said halogens are selected from chlorine, bromine, or mixtures thereof.

10. The composition of claim 9 wherein said halogen substituted monovalent hydrocarbon radicals are halogen substituted alkyl radicals.

11. The composition of claim 10 wherein said halogen substituted alkyl radicals contain from 1 to about 5 carbon atoms.

12. The composition of claim 5 wherein $R^3$-$R^8$ are independently selected from hydrogen or monovalent hydrocarbon radicals.

13. The composition of claim 12 wherein said monovalent hydrocarbon radicals are alkyl radicals.

14. The composition of claim 13 wherein said alkyl radicals contain from 1 to about 5 carbons.

15. The composition of claim 5 wherein said $R^3$-$R^8$ are all hydrogen.

16. The composition of claim 1 wherein said polyetherimide ester resin is comprised of the reaction products of:
   (a) at least one diol;

(b) at least one dicarboxylic acid or an ester forming reactive derivative thereof; and
(c) a set of reactants selected from
  (1) (i) at least one high molecular weight poly(oxy alkylene)diamine, and (ii) at least one tricarboxylic acid or a derivative thereof, or
  (2) at least one high molecular weight polyoxyalkylene diimide diacid.

17. The composition of claim 16 wherein said diol is a low molecular weight diol.

18. The composition of claim 17 wherein said low molecular weight diol has a molecular weight of about 250 or less.

19. The composition of claim 18 wherein said diol contains from 2 to about 15 carbon atoms.

20. The composition of claim 19 wherein said diol is selected from aliphatic or cycloaliphatic diols.

21. The composition of claim 20 wherein said diol is selected from butanediol, butenediol, hexanediol, cyclohexane dimethanol, or mixtures thereof.

22. The composition of claim 21 wherein said diol is butanediol.

23. The composition of claim 16 wherein said dicarboxylic acid or its derivative is an aromatic dicarboxylic acid or its derivative.

24. The composition of claim 23 wherein said aromatic dicarboxylic acid or its derivative is dimethylterephthalic acid or dimethylterephthalate.

25. The composition of claim 16 wherein (c) is (1).

26. The composition of claim 25 wherein said high molecular weight poly(oxy alkylene)diamine is represented by the general formula
$H_2N-G-NH_2$ wherein G is the radical remaining after the removal of the amino groups of a long chain alkylene ether diamine.

27. The composition of claim 26 wherein said poly(oxy alkylene)diamine has an average molecular weight of from about 600 to about 12,000.

28. The composition of claim 27 wherein said poly(oxy alkylene)diamine has an average molecular weight of from about 900 to about 4,000.

29. The composition of claim 16 wherein said tricarboxylic acid or its derivative (c)(1)(ii) is represented by the formula

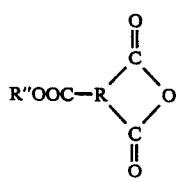

wherein R is a $C_1$ to $C_{20}$ trivalent aliphatic, cycloaliphatic or aromatic radical, and R" is hydrogen or a $C_1-C_6$ aliphatic monovalent radical.

30. The composition of claim 29 wherein said tricarboxylic acid or its derivative is trimellitic anhydride.

31. The composition of claim 16 wherein (c) is (2).

32. The composition of claim 31 wherein said high molecular weight polyoxyalkylene diimide diacid is represented by the formula

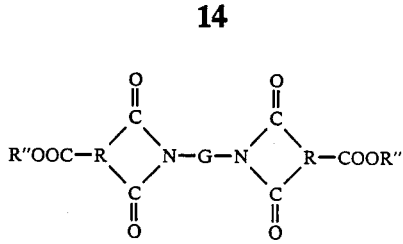

wherein:
  each R is independently selected from $C_1-C_{20}$ aliphatic, cycloaliphatic or aromatic trivalent organic radicals;
  each R" is independently selected from hydrogen, $C_1-C_6$ aliphatic or cycloaliphatic organic radicals, or $C_6-C_{12}$ aromatic monovalent organic radicals; and
  G is the radical remaining after the removal of the amino groups of a long chain alkylene ether diamine.

33. The composition of claim 32 wherein said long chain alkylene ether diamine has an average molecular weight of from about 600 to about 12,000.

34. The composition of claim 33 wherein said long chain alkylene ether diamine has an average molecular weight of from about 900 to about 4,000.

35. The composition of claim 34 wherein each R is a $C_6$ trivalent aromatic hydrocarbon radical and each R" is hydrogen.

36. The composition of claim 1 wherein said polyetherimide ester resin is comprised of at least the following recurring structural units

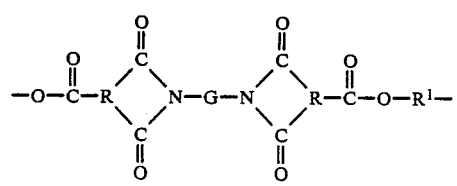

and

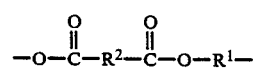

wherein:
  Rhu 1 is the residue of a diol absent the two hydroxyl groups;
  $R^2$ is the residue of a dicarboxylic acid absent the two carboxyl groups;
  R is a trivalent organic radical; and
  G is the radical remaining after the removal of the amino groups of a long chain poly(oxy alkylene) diamine.

37. The composition of claim 36 wherein said melamine compound is melamine.

38. The composition of claim 36 wherein said poly(oxy alkylene)diamine has an average molecular weight of from about 600 to about 12,000.

39. The composition of claim 38 wherein said poly(oxy alkylene)diamine has an average molecular weight of from about 900 to about 4,000.

40. The composition of claim 39 wherein said melamine compound is melamine.

41. The composition of claim 38 wherein $R^2$ is the residue of an aromatic dicarboxylic acid.

42. The composition of claim 41 wherein $R^2$ is the residue of dimethylterephthalate.

43. The composition of claim 42 wherein said melamine compound is melamine.

44. The composition of claim 38 wherein $R^1$ is the residue of a diol having a molecular weight of about 250 or less.

45. The composition of claim 44 wherein said diol is selected from butanediol, butenediol, hexanediot, cyclohexane dimethanol, or mixtures thereof.

46. The composition of claim 45 wherein said melamine compound is melamine.

47. The composition of claim 45 wherein said diol is butanediol.

48. The composition of claim 47 wherein said melamine compound is melamine.

49. The composition of claim 1 which further contains an effective stabilizing amount of at least one thermal stabilizer.

50. The composition of claim 1 which further contains a filler.

* * * * *